US012602903B2

(12) United States Patent
Witt

(10) Patent No.: US 12,602,903 B2
(45) Date of Patent: Apr. 14, 2026

(54) METHOD FOR ANALYZING IMAGE INFORMATION USING ASSIGNED SCALAR VALUES

(71) Applicant: Siemens Aktiengesellschaft, Munich (DE)

(72) Inventor: Jonas Witt, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 861 days.

(21) Appl. No.: 17/641,703

(22) PCT Filed: Sep. 11, 2019

(86) PCT No.: PCT/EP2019/074240
§ 371 (c)(1),
(2) Date: Mar. 9, 2022

(87) PCT Pub. No.: WO2021/047770
PCT Pub. Date: Mar. 18, 2021

(65) Prior Publication Data
US 2022/0301282 A1      Sep. 22, 2022

(51) Int. Cl.
*G06V 10/82*        (2022.01)
*G06V 10/75*        (2022.01)
(Continued)

(52) U.S. Cl.
CPC .......... *G06V 10/751* (2022.01); *G06V 10/762* (2022.01); *G06V 10/776* (2022.01); *G06V 10/82* (2022.01)

(58) Field of Classification Search
CPC ............... G06V 10/751; G06V 10/762; G06V 10/7635; G06V 10/82; G06V 10/776;
(Continued)

(56) References Cited

U.S. PATENT DOCUMENTS 5,887,694 A      3/1999  Krueger
8,547,428 B1    10/2013  Olsson et al.
(Continued)

FOREIGN PATENT DOCUMENTS

CN        101807245        8/2010
CN        107430772       12/2017
(Continued)

OTHER PUBLICATIONS

PCT International Search Report dated Mar. 30, 2020 based on PCT/EP2019/074240 filed Sep. 11, 2019.
(Continued)

*Primary Examiner* — Sumati Lefkowitz
*Assistant Examiner* — Michael Adam Shariff
(74) *Attorney, Agent, or Firm* — Cozen O"Connor

(57)        ABSTRACT

A method for analyzing image information using assigned scalar values includes a.) capturing a first image of an object or a situation and capturing at least one first scalar sensor value relating to the object or the situation; b.) capturing a second image of the object or the situation and capturing at least one second scalar sensor value relating to the object or the situation; c.) inserting the first image and the at least one first scalar sensor value into a first data structure as a consistent representation form, and inserting the second image and the at least one second scalar sensor value into a second data structure as a consistent representation form; d.) comparing the first and the second data structure and e.) outputting information if the comparison results in a difference that corresponds to a defined or definable criterion.

10 Claims, 6 Drawing Sheets

(51) Int. Cl.
*G06V 10/762* (2022.01)
*G06V 10/776* (2022.01)

(58) Field of Classification Search
CPC .... G06V 10/42; G06V 10/431; G06V 10/426;
G06V 10/86; G06T 2207/20084; G06T
7/0004; G06T 7/001; G06T 2207/30108;
G06T 7/262; G06T 2207/20048; G06T
2207/20052; G06T 2207/20056; G06T
2207/20072
See application file for complete search history.

(56) References Cited

U.S. PATENT DOCUMENTS

| | | | |
|---|---|---|---|
| 2013/0083324 A1 | 4/2013 | Wilhelm | |
| 2017/0032281 A1 | 2/2017 | Hsu | |
| 2017/0132496 A1 | 5/2017 | Shoaib et al. | |

| | | | |
|---|---|---|---|
| 2018/0018778 A1 | 1/2018 | Haverkamp et al. | |
| 2018/0293722 A1 | 10/2018 | Crocco et al. | |
| 2018/0293723 A1* | 10/2018 | Bae | G06F 18/2115 |

FOREIGN PATENT DOCUMENTS

| | | | |
|---|---|---|---|
| CN | 108351984 | 7/2018 | |
| KR | 101396987 B1 * | 5/2014 | G06Q 50/10 |
| WO | 9807100 | 2/1998 | |

OTHER PUBLICATIONS

Olsson L J et al: "Web Process Inspection Using Neural Classification of Scattering Light", IEEE Transactions on Industrial Electronics, IEEE Service Center, Piscataway, NJ, USA, vol. 40, No. 2, pp. 228-234, XP000387382, ISSN: 0278-0046, 1993.
Liu Qingli, "Research of Infrared Scene Enhancement Algorithm Based on Kinect Sensor", Jul. 15, 2016.

* cited by examiner

Evaluation of data for the second intermediate product

FIG 4

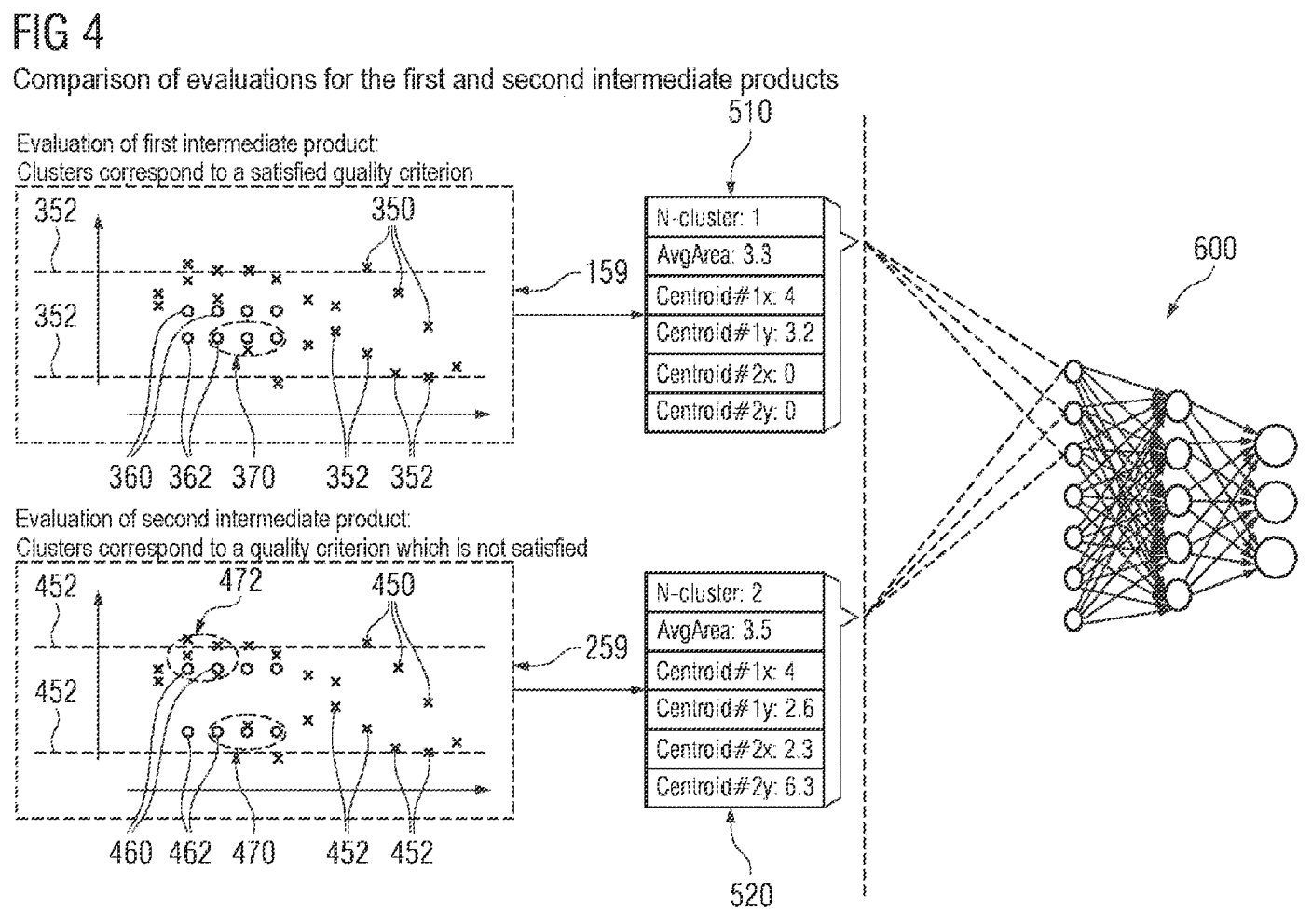

Comparison of evaluations for the first and second intermediate products

Evaluation of first intermediate product:
Clusters correspond to a satisfied quality criterion

| N-Cluster: 1 |
| AvgArea: 3.3 |
| Centroid#1x: 4 |
| Centroid#1y: 3.2 |
| Centroid#2x: 0 |
| Centroid#2y: 0 |

510

159

350
352  352
360  362  370

352
352

Evaluation of second intermediate product:
Clusters correspond to a quality criterion which is not satisfied

| N-Cluster: 2 |
| AvgArea: 3.5 |
| Centroid#1x: 4 |
| Centroid#1y: 2.6 |
| Centroid#2x: 2.3 |
| Centroid#2y: 6.3 |

520

259

450
452  452
460  462  470

472
452
452

600

METHOD FOR ANALYZING IMAGE INFORMATION USING ASSIGNED SCALAR VALUES

CROSS-REFERENCE TO RELATED APPLICATIONS

This is a U.S. national stage of application No. PCT/EP2019/074240 filed 11 Sep. 2019.

BACKGROUND OF THE INVENTION

1. Field of the Invention

The present invention relates to a method for analyzing image information or acoustic information using assigned scalar values, where the method comprises a.) capturing a first image or a first item of acoustic information relating to an object or a situation and capturing at least one first scalar sensor value relating to the object or the situation, and b.) capturing a second image or a second item of acoustic information relating to the object or the situation and capturing at least one second scalar sensor value relating to the object or the situation.

2. Description of the Related Art

Methods for analyzing image information or acoustic information are known from the prior art. For example, US publication No. 2017/0032281 A1 discloses a method for monitoring a welding system, in which a wide variety of sensor or image data are captured in order to train a neural network with the captured data. This published patent application also discloses a method in which a characteristic of the welding seam produced or the welding process is predicted with the aid of the trained neural network and using image or sensor data recorded during a welding process.

A disadvantage of the cited prior art is that it is very complicated to create and use a neural network. Both the creation and the setting-up, but also in particular the training, of the neural network are complicated and require a large number of items of training data in order to function reliably. Such training data are often not available, at least not in a sufficient number.

SUMMARY OF THE INVENTION

In view of the foregoing, it is therefore an object of the present invention to provide a method for analyzing sensor data, where the method can also be used, inter alia, to analyze more complex sensor data with a reduced amount of effort.

This and other objects and advantages are achieved in accordance with the invention by a method for analyzing image information using assigned scalar values, where the method comprises the a.) capturing a first image of an object or a situation and capturing at least one first scalar sensor value relating to the object or the situation, b.) capturing a second image of the object or the situation and capturing at least one second scalar sensor value relating to the object or the situation, c.) inserting the first image and the at least one first scalar sensor value as a consistent representational form into a first data structure, and inserting the second image and the at least one second scalar sensor value as a consistent representational form into a second data structure, d.) comparing the first data structure and the second data structure, and e.) outputting an item of information if the comparison reveals a difference corresponding to a predefined or predefinable criterion.

Creating the consistent representational form of the corresponding data structures makes it possible to combine both image information and associated scalar information within a consistent presentation form or data structure and to thus allow completely novel mechanisms by comparing two or more data structures of this type. More complex sensor data can therefore also be analyzed without necessarily having to resort to evaluations using neural networks.

Indeed, in one possible embodiment, the comparison of the first and second data structures or the check to determine whether a predefined or predefinable criterion has been satisfied, can be performed not only manually or using automated analytical methods but also using a neural network. However, such a neural network would possibly be entirely easier to configure and train than a neural network that would be needed directly to analyze the image and sensor data. Here, a scalar value may be, for example, an alphanumeric value, an alphanumeric character string, an integer numerical value, a floating-point numerical value, a Boolean value, a string value or a similar value. Scalar values represent to a certain extent 0-dimensional value arrangements, in contrast to vectors which represent 1-dimensional value arrangements and matrices that represent 2-dimensional or even higher-dimensional value arrangements.

Image information and images in the sense of the present disclosure are considered to be matrices, i.e., an image is a matrix-like value, where the individual elements of an image are its pixels, for example, which may be characterized by a position in two or more dimensions and one or more brightness and/or color values. Here, the captured images may each be configured, for example, as 2-dimensional or higher-dimensional pixel or vector graphics.

Image information and images may also have more than two dimensions by virtue of, for example, further two-dimensional information planes being virtually superimposed on a two-dimensional image plane. For example, a further plane, in which material density values, x-ray information values or similar further property values, for example, are assigned to the individual pixels, can be superimposed on a two-dimensional grayscale, brightness value and/or color value pixel image.

The first and second images can be captured using any type of suitable camera, for example. The recording can be performed, for example, in various optical frequency ranges, for example, in the visible range, in the infrared range, in the ultraviolet range and/or in the x-ray range or in another suitable spectral range. Here, suitable image capture methods and devices or cameras can be respectively used for capture. Furthermore, images can also be captured using further suitable image capture methods, such as thermographic methods (i.e., methods for two-dimensional temperature capture), MRI (magnetic resonance imaging) methods, x-ray structure analysis methods or other methods that are suitable for generating a two-dimensional pixel or vector image.

Furthermore, the images may also be captured, for example, via a scanner, a screenshot (=digital image of a 2-dimensional representation displayed on a screen, a display or a monitor) or in a comparable manner.

The first and second images may be, for example, temporally successive images of a situation or an object.

Furthermore, the first and second images may also be an image of an object or of a situation that is recorded at a particular point in time and a corresponding reference image of this object or of the situation. Such a reference image may represent, for example, an original, target or desired configuration of the object or the situation.

An image of a situation may be, for example, an image of a particular spatial area or of a particular logical situation. Logical situations may be characterized, for example, by certain criteria or triggering features or events. For example, during a method sequence or production of a particular product, a particular method step or production step or the result of a particular method step or production step (for example, an intermediate or end product or result) may be such a logical situation.

A situation may also be given, for example, by a geographical location and/or further characterizing properties, for example, a time, a time range, particular brightness values, particular captured sensor data such as temperatures, person recognition, or similar properties.

A situation may be, for example, a particular situation in road traffic, for example, given by a particular location and spatial angle, or a production situation, given by a particular production machine or a particular production step. A situation may also be given, for example, by a corresponding method sequence, such as a combustion process, a transport process, interaction between various persons or similar processes.

Objects may be any type of objects, apparatuses, installations, machines, living beings or any other material objects which can be captured using optical or other sensors.

A sensor value may be a value from a sensor that is relevant to the production sequence and is intended to capture a physical variable, a material property, a chemical property, identifier information or any information relating to the product in the production sequence or the production installation or parts thereof.

In this case, a scalar sensor value may be any type of scalar value, for example, a numerical value, an alphanumeric value, an alphanumeric character string, an integer numerical value, a floating-point numerical value, a Boolean value, a string value or a similar value.

A scalar sensor value may be, for example, a number, one or more letters or words or another alphanumeric data item. Here, the sensor value can be output by a corresponding sensor.

The capture of at least one scalar sensor value may be configured in this case such that only one scalar sensor value is captured.

Furthermore, a plurality of values, provided by a sensor at different points in time, can also be captured as the at least one scalar sensor value (for example, a so-called "time series"). Here, one, individual ones or all of these values, for example, or a mean value of all or individual ones of these values, for example, can be used when creating the respective data structure.

The at least one first and second scalar sensor value may each also relate, for example, to different aspects or parts of the object or situation (for example, temperatures at different points of an object). If a plurality of sensor values have been captured as the at least one first or second sensor value, for example, then one, individual ones or all of these values, for example, or a mean value of a plurality of or all of these values, for example, can be used when creating the respective data structure.

The fact that both an image and at least one scalar sensor value relate to the same object may mean, for example, that both the image and the at least one scalar sensor value relate to at least one section of the object, where the section relating to the image may differ from the section relating to the sensor value. For example, the image may be captured from a first part of an object and a corresponding sensor value, such as a temperature value, may be recorded at another part of the same object.

The fact that both an image and at least one scalar sensor value relate to the same situation may mean, for example, that a corresponding sensor value relates, for example, to an object and/or a spatial area that is contained or at least partially contained in the captured image. For example, if the situation corresponds to a particular road traffic situation, a sensor value may be, for example, an air temperature of the air present in the recorded area or a brightness value captured within the recorded area. Furthermore, the sensor value may also be logically assigned to a situation by virtue of a time that prevails at the recording point in time being assigned as a sensor value to a corresponding traffic situation, for example.

Using the example of production monitoring, the image information may be based on an intermediate product, for example, and the associated sensor values may relate to the production step leading to the intermediate product (for example, a temperature or a temperature profile during the production step or a winding speed when producing a wound multi-layer film-type battery). Such an "intermediate product" is likewise an example of a situation in the sense of the present description. For example, a first image of a first intermediate product would then be captured with sensor values relating to this first intermediate product, and a second image of a second intermediate product would be captured together with the sensor values relating to the second intermediate product.

Furthermore, during production monitoring, images of a particular installation part or of a particular production machine may be captured, for example, and corresponding sensor values can be captured from sensors of this machine or this installation part.

Corresponding situations may also relate, for example, to the monitoring of a vehicle, in particular a self-driving vehicle. For example, a camera situated on or in the vehicle may capture a particular environmental image and the corresponding sensor values may be environmental parameters of the captured environment, for example a humidity value of a road, weather or climate information, measurement parameters relating to objects or persons in the surroundings, a temperature, a time of day, etc. Furthermore, sensor parameters in this respect may also be, for example, information taken from the recorded image by means of text or handwriting analysis, such as an inscription on a road and/or traffic sign.

Corresponding objects and/or situations may also come from the field of medical diagnostics, materials testing or other applications of image evaluation methods. For example, as part of medical diagnostics, a captured image may be assigned sensor values relating to blood values of a patient, the body temperature of the latter, acoustic parameters (for example, relating to breathing noises, and/or coughing noises).

Very generally, a data structure in connection with the present disclosure is understood as meaning a representation of information in a computer or a corresponding electronic storage device ("in bits or bytes"). This also corresponds to the definition of the term "data structure" in IT.

In this case, the insertion of the respective image and the corresponding respective at least one sensor value as a consistent representational form into a first data structure means, for example, that the respective data sets are each configured such that all values included in the respective data structure are characterized by one or more variables in respectively standard scales.

In this case, the respective data structures may be configured, for example, such that all included values are characterized by a variable in a standard scale. A graphical representation as a number line, a linear axis or a comparable 1-dimensional representation with values accordingly recorded thereon, for example, may be assigned or correspond to data sets configured in this manner.

Furthermore, the data structures may each also be configured such that all included values are each characterized by two variables in a standard scale in each case. A graphical representation as a two-dimensional diagram with two linear axes in each case or two axes corresponding to the represented values, or a comparable 2-dimensional representation, such as a graph, with values accordingly represented therein, for example, may be assigned to data structures configured in this manner.

Furthermore, the data structures may also each be configured such that all included values are each characterized by three or more variables in a standard scale in each case. Corresponding 3-dimensional or higher-dimensional representations can then be assigned or correspond to such data sets.

The insertion of a respective image and one or more sensor values into a consistent representational form of a data structure can be performed, for example, at least using a method sequence described below. For example, a recorded image may be subjected to appropriate image processing in a first step. In addition to adapting corresponding color, brightness, contrast and similar image parameters, such image processing may also comprise a corresponding transformation and/or distortion or rectification of the image. Such a transformation may comprise, for example, a spatial transformation or a transformation to the frequency domain, for example. It is then possible to select, for example, particular pixels and/or various frequency components for insertion into the data structure or the entire image can be inserted into the data structure.

When inserting the at least one sensor value into the consistent representational form of the data structure, certain processing of the captured values may comprise, for example, standardization or adaptation to a predefined scale on which the representational form is based, for example, likewise as a first step. The corresponding values, possibly after further adaptation of a scale or to the representational form of the data structure, may subsequently then be accordingly inserted into the data structure.

This produces a data structure that combines both the data of the captured image and the data of at least one sensor value captured in this respect within a standard representational form.

The first and second data structures may be compared, for example, by comparing individual data points or all data points of the first data structure with the corresponding associated data of the second data structure. For example, determined deviations of these points can then be summed or a mean value of the deviations may be stated or calculated.

Furthermore, particular segmentation of the respective images may also be part of the process of comparing the data structures. This makes it possible to compare, for example, certain parameters of the individual segments of the first image with the corresponding parameters of the corresponding segments of the second image and to possibly determine associated deviations.

Part of the comparison of the first and second data structures may also comprise clustering of the respective data structures, wherein the determined cluster structures relating to the first and second data structures are then compared after the clustering. This is discussed in yet more detail below.

In this case, method step e.) may be configured, for example, such that the information that is output is configured as an item of warning information and the predefined or predefinable criterion corresponds to an error criterion.

A predefined or predefinable criterion for outputting an item of information may relate to each comparison value determined when comparing the first and second data structures.

As previously mentioned, a predefined or predefinable criterion may be, for example, a cumulative or average deviation of values of the first data structure from accordingly associated values of the second data structure. Furthermore, particular limit values within the scope of the determined differences in the segmentation of the first and second data structures or differences in the determined cluster structures of the first and second data structures may also correspond to the predefined or predefinable criterion for outputting an item of information. For example, within the scope of clustered first and second data structures, a predefined or predefinable criterion may be the fact that a determined number of clusters differs in the first and second data structures or cluster centroids between the first and second data structures differ by at least a particular predefined value.

The output of an item of information may be, for example, an indication that a corresponding significant change has been detected between the situations or objects respectively captured in the first and second images. Such an item of information may then be a suggestion to a user, for example, to check the corresponding situation, production installation or the corresponding object or the like, to initiate test or disruptive measures or to forward a corresponding item of information.

Furthermore, the output of an item of information may also be the output of a control command or the output of an alarm or control message. Here, the control command or the corresponding alarm or control message may be forwarded, for example, to a corresponding controller, a control unit, a master computer, a computer or a similar device that can automatically initiate an appropriate action, for example.

A method in accordance with the present disclosure may also be configured such that, in order to create the first data structure and the second data structure, the respectively captured image is respectively transformed to the frequency domain, in particular that, in order to create the first data structure and the second data structure, the captured image is respectively transformed to the frequency domain using a Fourier analysis method.

In this case, the Fourier analysis method may be configured, for example, as a so-called "discrete Fourier transform", a so-called "fast Fourier transform" or a so-called "discrete cosine transform" (DCT). The "discrete cosine transform" (DCT) is also used, for example, as part of the Joint Photographic Expert Group (JPEG) compression for images and is therefore an established method for transforming images to the frequency domain.

The frequency transformation of an image has the advantage that certain structural properties, for example distinctly contrasting objects, line structures, edges or the like, can be more easily detected by the transformation. Furthermore, a frequency transformation makes it possible to represent an item of image information based on amplitude information relating to a particular frequency comb. Representing the individual waves of the frequency comb along a spatial axis therefore makes it possible to represent image information along one or more spatial axes, which allows the sensor values to be removed using individual spatial sampling points within the frequency domain. This makes it possible to achieve a standard representational form of the data structure in a simplified manner.

A method in accordance with the present disclosure may also be configured such that at least one first scalar parameter value relating to the object or situation is also captured within method step a.), and such that at least one second scalar parameter value relating to the object or situation is also captured within method step b.), where the first data structure and the second data structure are also created using the at least one first scalar parameter value and the at least one second parameter value.

In this case, within method step c.), the at least one first parameter value is also inserted into the consistent representational form of the first data structure and is possibly also transformed into the corresponding representation or adapted to the latter for this purpose. In a comparable manner, the at least one second parameter value is also inserted into the consistent representational form of the second data structure and is possibly also transformed into the corresponding representation or adapted to the latter for this purpose.

This makes it possible to introduce a wide variety of further sensor values or other values relating to the object or the situation into the corresponding analysis and to thus improve the analysis and/or to make it more robust or sensitive, depending on the choice of parameters and the comparison or evaluation method.

A parameter value may be, for example, a sensor value, such as a value output by a sensor assigned to the object or the situation. A parameter value may furthermore also be any value otherwise assigned to the object or the situation. Such a value assigned to the object or the situation may describe or relate to properties, states, behaviors, characteristic variables or similar information relating to the object or the situation, for example. Scalar parameter values may be, for example, numerical, alphanumeric, Boolean and/or string values.

Furthermore, a method in accordance with the present disclosure may be configured such that the first data structure and the second data structure are compared using a neural network. Here, the neural network may be configured as a trained neural network.

Such a neural network may be trained in this case in such a manner that corresponding data structures with a standard representational form are respectively created for a multiplicity of compilations of image information with assigned sensor or parameter information. These data structures can then be manually assigned a corresponding evaluation result, for example. Such an evaluation result may correspond, for example, to a comparison value of a comparison of the corresponding data structures with a corresponding further data structure according to the present description. Furthermore, such an evaluation result may correspond to a good-or-bad or improvement-or-deterioration analysis, such as when using a method in accordance with the present disclosure to monitor production or a method sequence.

For the purpose of comparing the first and second data structures, such a neural network can then be used, for example, such that the first and second data structures are supplied to the neural network in a corresponding suitable manner in accordance with conventional methods known from the prior art and that neural network outputs a corresponding comparison value or a good/bad value or an improved/deteriorated value.

At least in connection with the present disclosure, a neural network is understood as meaning an electronic device comprising a network of so-called nodes, where each node is generally connected to a plurality of other nodes. The nodes are also referred to as neurons or units, for example. Here, each node has at least one input connection and one output connection. Input nodes for a neural network are understood as meaning those nodes that can receive signals (data, stimuli, patterns or the like) from the outside world. Output nodes of a neural network are understood as meaning those nodes that can forward signals, data or the like to the outside world. So-called "hidden nodes" are understood as meaning those nodes of a neural network that are configured neither as input nor as output nodes.

A neural network can generally be trained by determining parameter values for the individual nodes or for their connections by inputting input data to the neural network and analyzing the then corresponding output data from the neural network using a wide variety of known learning methods. In this manner, a neural network can be trained using known data, patterns, stimuli or signals in a manner nowadays known per se in order to then be able to use the network trained in this manner to analyze further data, for example.

In this case, the neural network may be, for example, in the form of a so-called "deep neural network" (DNN). Such a "deep neural network" is a neural network in which the network nodes are arranged in layers (where the layers themselves may be one-dimensional, two-dimensional or higher-dimensional). Here, a deep neural network comprises at least one or two "hidden layers" that comprise only nodes that are not input nodes or output nodes. That is, the hidden layers do not have any connections to input signals or output signals.

Here, "deep learning" is understood as meaning, for example, a type of machine learning techniques that uses a large number of layers of the non-linear information processing for supervised or unsupervised feature extraction and transformation and for pattern analysis and classification.

The deep neural network may also have, for example, an "auto-encoder structure", which is explained in yet more detail over the course of the present disclosure. Such an auto-encoder structure may be suitable, for example, for reducing a dimensionality of the data and thus detecting similarities and commonalities, for example.

A deep neural network may also be in the form of a "classification network", for example, which is particularly suitable for dividing data into categories. Such classification networks are used in connection with handwriting recognition, for example.

A further possible structure of a neural network with a deep learning architecture may be, for example, the configuration as a "deep believe network".

A neural network with a deep learning architecture may also have, for example, a combination of a plurality of the structures mentioned above. For example, the deep learning architecture may comprise an auto-encoder structure to reduce the dimensionality of the input data, which can then also be combined with another network structure to detect special features and/or anomalies within the data-reduced dimensionality or to classify the data-reduced dimensionality, for example.

One of the "supervised learning" methods can be used, for example, to train the neural network with the deep learning architecture. Here, training with appropriate training data is used to train a network with results or capabilities respectively assigned to the data. Furthermore, an "unsupervised learning" method can also be used to train the neural network. For a given set of inputs, such an algorithm generates, for example, a model that describes the inputs and allows predictions to be made therefrom. In this case, there are clustering methods, for example, which can be used to divide the data into different categories if they differ from one another in terms of characteristic patterns, for example.

When training a neural network, it is also possible to combine supervised and unsupervised learning methods, such as when trainable properties or capabilities are assigned to parts of the data, whereas this is not the case for another part of the data.

Furthermore, it is also possible to use, at least inter alia, "reinforcement learning" methods to train the neural network.

Generally, the training of the neural network is understood as meaning the fact that the data that are used to train the neural network are processed in the neural network with the aid of one or more training algorithms to calculate or change bias values ("bias"), weight values ("weights") and/or transfer functions of the individual nodes of the neural network or of the connections between in each case two nodes within the neural network.

The values describing the individual nodes and their connections, including further values describing the neural network, can be stored, for example, in a set of values describing the neural network. Such a set of values then constitutes, for example, a configuration of the neural network. If such a set of values is stored after the neural network has been trained, then a configuration of a trained neural network is therefore stored, for example. It is possible, for example, to train the neural network in a first computer system using appropriate training data, to then store the corresponding set of values assigned to this neural network and to transfer it to a second system as a configuration of the trained neural network.

For example, training that requires a relatively high computing power of a corresponding computer can occur on a high-performance system, whereas further work or data analyses using the trained neural network can then certainly be performed on a lower-performance system. Such further work and/or data analyses using the trained neural network may be performed, for example, on an assistance system and/or on a control device, a programmable logic controller or a modular programmable logic controller according to the present description.

A method in accordance with the present disclosure can furthermore also be configured such that the first data structure and the second data structure each have a two-dimensional or higher-dimensional diagram structure or a two-dimensional or higher-dimensional graph structure or are each represented or can be represented as a two-dimensional or higher-dimensional diagram or a two-dimensional or higher-dimensional graph.

In this case, for example, when creating the first and second data structures, a respective diagram, a respective graph or a respective diagram or graph structure can initially be created and a clustering method can then be applied thereto. Furthermore, the clustering may also already be implemented in parallel with the creation of the diagram, the graph or the diagram structure or graph structure. As a result, the first and second data structures then already comprise both the respective diagrams, graphs, diagram structures or graph structures and the respective cluster structures therefor.

Alternatively or additionally, when comparing the first and second structures, a clustering method can be applied to the respective diagrams, graphs, diagram structures or graph structures. This can be performed both when clustering has not yet been applied to the respective diagrams, graphs, diagram structures or graph structures and when a clustering method has already been applied thereto, as described above for example, when producing the data structure ("hierarchical clustering").

A diagram structure or a diagram is understood as meaning any structure that can be represented within a corresponding coordinate system, in particular can be represented as individual data points within a corresponding coordinate system. Here, a structure that can be represented, for example, as individual data points within an N-dimensional diagram corresponds to an N-dimensional diagram structure or an N-dimensional diagram.

A graph structure or a graph is understood here as meaning any structure that can be represented as a corresponding graph. Here, such a graph or such a graph structure may be configured that, for example, the nodes of the graph correspond to individual values of the data structure and are linked to corresponding connections, the so-called "edges" of the graph. Here, such connections or edges may be configured such that, for example, all points are linked to all other points, one point is linked only to a maximum number of arbitrary points and/or a (sampling) point from the frequency domain is necessarily connected to all samples of the further sensor values, in particular is connected to at most a predefined or predefinable number of further samples of the frequency domain.

Furthermore, parts of the values determining the nodes may also correspond to a part of the data structure and a further part of the data structure may correspond to the associated edges in a corresponding graph or a corresponding graph structure.

This configuration of the present method has the advantage that there are very efficient and established methods for evaluating such diagrams and/or graphs and comparing them with one another. This makes it possible to further simplify a comparison of the data structures and a corresponding comparison of a comparison result with predefinable or predefined criteria.

Root cause analysis is very important for industrial production processes, for example, and is more easily possible in particular when using a method in accordance with the present disclosure, in particular when using a clustering method in accordance with the present disclosure as part of such a method. As part of such use, the change of clusters, for example, can be subsequently comprehended, for example, by tracking node movements within corresponding graphs. Within a method in accordance with the present disclosure, nodes can indeed directly emerge from either sensor values or harmonic waves of the frequency domain. Such nodes can then be assigned, for example, either the respective sensor values or the harmonic waves of the frequency domain, from which they emerged. If, for example, certain nodes result in the cluster structure being changed, the time series/image components behind them can hereby be immediately identified as causes, for example.

Very generally, a graph is a mathematical construct which is constructed from "nodes" and "edges" connecting two nodes in each case. A graphical representation of such graphs may be, for example, a representation in which the nodes are represented as dots or circles and the edges are represented as lines respectively connecting circles. Here, edges may be, for example, "non-directional edges" in which no logical direction is assigned to the connection of the respective nodes. Furthermore, edges may also be in the form of "directional edges" in which a logical direction or meaning is assigned to the connection of the respective nodes.

A method in accordance with the present disclosure may also be configured such that, when creating the first data structure and the second data structure in accordance with method step c.), a clustering method has been or is respectively applied to the respective diagrams, graphs, diagram structures or graph structures of the first and second data structures, or such that, when comparing the first data structure and the second data structure in accordance with method step d.), a clustering method is respectively applied to the respective diagrams, graphs, diagram structures or graph structures of the first and second data structures.

The comparison of the first and second data structures in accordance with method step d.) and the creation of the first and second data structures in accordance with method step c.) can be performed, for example, by applying one or more clustering methods to the respective diagrams, graphs, diagram structures or graph structures of the first and second data structures.

Following such clustering, the clusters, cluster structures, cluster properties or the like identified in accordance with the preceding clustering can then also be compared, for example within method step d.).

Furthermore, in this context, a predefined or predefinable criterion that initiates the output of an item of information in accordance with method step e.) may comprise or be a criterion relating to the difference in a number of identified clusters, a criterion relating to one or more differences in position between identified clusters or a criterion relating to other differences in terms of properties, the number and position of respectively identified clusters.

In this case, the use of the clustering method may be an automated clustering method, for example. Here, clustering of the data structures can be performed, for example, with the aid of appropriate software, upon the execution of which the clustering method is automatically performed. Here, one or more clustering algorithms may be implemented as part of the software, for example.

Furthermore, the use of the clustering method may also be a semi-automated clustering method, for example. This can be implemented, for example, via appropriate software, upon the execution of which the clustering method is performed in a semi-automatic manner. This may be implemented, for example, such that the software expects corresponding user inputs at certain points in time while performing the clustering method.

The use of the clustering method may comprise, for example, the use of a clustering algorithm or the use of a plurality of clustering algorithms, for example in succession. Such clustering algorithms may be, for example, "k-means clustering", "mean-shift clustering", "expectation maximization (EM) clustering using Gaussian mixture models (GMM)", "agglomerative hierarchical clustering" and/or "density-based spatial clustering", for example, "density-based spatial clustering of applications with noise (DB-SCAN)". Further examples of clustering algorithms may be the following algorithms, for example: "mini batch k-means", "affinity propagation", "mean shift", "spectral clustering", "Ward", "agglomeration clustering", "BIRCH", "Gaussian mixture".

Clusters are therefore considered to be groups of similar data points or data groups which are formed by means of an appropriate cluster analysis or appropriate clustering.

Clustering is very generally understood as meaning a "machine learning" technique in which data or data points are grouped into so-called "clusters". In the case of a set of data or data points, it is possible to use, for example, a cluster analysis method, a clustering method or a clustering algorithm to classify each data item or each data point or individual data items or data points in a particular group. Such a group is then referred to as a "cluster". Here, data or data points in the same group (i.e., the same cluster) have similar properties and/or features, whereas data points in different groups have very different properties and/or features.

Mathematically, clusters consist of objects which have a shorter distance (or conversely: higher similarity) than the objects in other clusters. It is possible to distinguish corresponding clustering methods in accordance with the distance or proximity measures used between objects in the clusters or between entire clusters, for example. Furthermore or alternatively, it is also possible to distinguish corresponding clustering methods in accordance with respective calculation rules for such distance measures.

Cluster analyses or clustering methods should be understood as meaning methods for discovering similarity structures in large volumes of data. These include, for example, methods supervised or unsupervised machine learning methods such as k-means or DBSCAN. The cluster analysis results in clusters. The advantage here is that the data can be analyzed in a fully automated manner. Supervised learning would be appropriate if data were already available in contextualized form. Unsupervised learning algorithms also make it possible to find similarity structures in data which have not yet been contextualized. The clusters that have been found can then be analyzed by a domain expert.

When performing the clustering method or a clustering algorithm in accordance with the present disclosure, it is possible in this case to use the wide variety of conventional distance measures or similarity measures for numerical data, binary data, string data, categorical data, text data and/or time series data, depending on the type of data categories used.

Examples of such clustering methods or algorithms are: "unsupervised clustering", the k-means clustering method, the image processing methods for identifying structures that belong together within available images or image information, and/or a combination of the methods mentioned above.

In this case, the clustering method used can be selected in a manner adapted to the data types within the available data.

A method in accordance with the present disclosure may also be configured such that the method is configured to monitor a method sequence or production sequence such that the capture of the first image and of the second image is configured as the capture of a first and a second image of an object relating to the production sequence or a situation relating to the production sequence, and such that the capture of the at least one first and second scalar sensor value is configured as the capture of at least one first and at least one second scalar sensor value relating to the object relating to the production sequence or the situation relating to the production sequence.

The progress of a method or production or of particular production steps can be efficiently analyzed and/or monitored, for example, using a method configured in this manner. A method configured in this manner makes it possible to include both image information and sensor information relating to the method or production in the analysis, as a result of which the method or selected method steps or production steps can be captured and characterized particularly well and/or comprehensively.

Furthermore, the analysis of these data, for example when comparing the data structures determined in the process, can certainly be performed using a neural network, but such a neural network is not absolutely necessary. Such a method therefore further simplifies the analysis of production methods in comparison with methods known from the prior art.

In this case, the predefined or predefinable criterion for outputting a corresponding item of information may be selected, for example, such that an item of information is output when defective states or defective products or hazardous states might be present during the method sequence or production sequence. The information may then be, for example, a corresponding item of warning information or a corresponding control command which, for example, switches off certain method parts or areas or production segments or changes them to a safe state. Furthermore, corresponding information may also be alarm messages which can then be output, processed and/or disseminated using a corresponding alarm system, for example.

In this case, a captured image may be in the form of an image of an end or intermediate product of a production method, for example. Furthermore, an image may be, for example, in the form of an image of an installation or device component or of an installation or device part of an installation or device used during a production method.

Corresponding sensor values may be, for example, sensor values characterizing the production method, such as a temperature or a temperature profile of a furnace, a transport speed of a web processed during the production method, power or consumption values of a method step occurring during the production method or comparable sensor values relating to a production method or production step that leads to an intermediate or end product, for example.

Furthermore, the image may be assigned to a method sequence, such as an image that has been or is recorded inside a combustion chamber of a gas turbine. Anomalies within such a combustion method, for example, can be detected via such images using a method in accordance with the present disclosure.

A time series of the power of the gas turbine, for example, can then be used in this case as at least one assigned sensor value. Generally, any sensor value characterizing the method sequence or coming from the method sequence can also be used here as the at least one assigned sensor value. This may be, for example, the already mentioned time series or individual values relating to a power, a speed, a temperature or further measurement variables characterizing the method step.

A method in accordance with the present disclosure may also be configured such that the production sequence is configured to produce a product and comprises a sequence of production steps, where there is an intermediate product after a selected production step from the sequence of production steps has been performed, and such that the first image is also configured as a first intermediate product image, the at least one first scalar sensor value relates to the selected production step, the second image is configured as a second intermediate product image, and the at least one second scalar sensor value relates to the selected production step.

It is a further object of the invention to provide a method for monitoring a production sequence for producing a product, where the production sequence comprises a sequence of production steps, and where there is an intermediate product after a selected production step from the sequence of production steps has been performed, where the method comprises: a.) capturing a first intermediate product image and capturing at least one first scalar sensor value relating to the selected production step; b.) capturing a second intermediate product image and capturing at least one second scalar sensor value relating to the selected production step; c.) inserting the first image and the at least one first scalar sensor value as a consistent representational form into a first data structure, and introducing the second image and the at least one second scalar sensor value as a consistent representational form into a second data structure; d.) comparing the first and second data structures; and e.) outputting an item of information if the comparison reveals a difference corresponding to a predefined or predefinable criterion.

In this case, method step e.) may be configured, for example, such that the information that is output is configured as an item of warning information and/or the predefined or predefinable criterion corresponds to an error criterion.

Furthermore, the first image may be designed and configured as a first intermediate product image of a first intermediate product available at a first point in time and the second image may be configured as a second intermediate product image of a second intermediate product available at a second point in time, for example.

During discrete manufacturing of successive individual products, the first and second points in time may be selected, for example, in such a manner that a first intermediate product is available at the first point in time and an intermediate product immediately following the first intermediate product is available at the second point in time, with the result that each intermediate product is compared with the preceding product within the production sequence. The first and second points in time may also be selected such that not every intermediate product is compared with the preceding intermediate product, but rather only every second, fifth, tenth or other intermediate product is considered in each case.

During continuous production, the first and second points in time may be spaced apart from one another, for example, such that they correspond to a typical time in which the corresponding method sequence changes. This may be, for example, a control time constant for a process contributing to the method or for a device involved in the method, for example a furnace, a heating system, a cooling system, a combustion system, a conveyor belt, a machine tool, a processing machine or the like.

In accordance with the above-mentioned image capture of the first and second images at the first and second points in time, the at least one first scalar sensor value may relate to the selected production step and may be captured at at least one further first point in time based on the first point in time. Furthermore, the at least one second scalar sensor value may relate to the selected production step and may be captured at at least one further second point in time based on the second point in time.

For example, the at least one further first point in time based on the first point in time may be selected such that the accordingly recorded sensor values are captured, for example, while producing the intermediate product respectively captured by the image. Furthermore, the at least one further first point in time may be selected such that, when analyzing a method sequence for example, the sensor values are recorded at points in time that are causally related to the state captured in the image. A corresponding situation also applies to the relationship of the at least one further second point in time based on the second point in time with respect to the capture of the second sensor values and the second image.

Very generally, the at least one further first and second point in time based on the first and second points in time may be selected in such a manner that the respectively captured at least one sensor value is causally related to the situation or object captured with the first and/or second image.

The sequence of production steps may consist of one or more production steps, for example. Here, the production steps of a production sequence may be configured, for example, such that a production step is respectively performed by a respective production machine and/or a production device. Furthermore or additionally, a production step may be characterized, for example, by a particular setting of parameter values or a particular sequence of parameter values (for example, a heating process or a cooling process).

The sequence of production steps makes it possible to achieve, for example, a "discrete" method in which successive individual products (for example, automobiles, and/or cell phones) are produced. Here, an intermediate product may be, for example, an intermediate product that is available after a particular production step and ended the corresponding production step at a stated point in time.

The sequence of production steps also makes it possible to achieve, for example, a "continuous" method in which certain materials or substances are produced continuously, for example. In the case of methods configured in this manner, an intermediate product may then be an intermediate product which is available at a stated point in time after or during a method step.

Furthermore, the sequence of production steps also makes it possible to achieve a "batch" method that is virtually a hybrid of a discrete method and a continuous method. In this case, intermediate products may be used in accordance with the above-mentioned explanation of both discrete methods and continuous methods.

A method in accordance with the present disclosure may also be configured such that, within method step c.), the first data set is created using at least one further first production parameter value, and the second data set is created using at least one further second production parameter value.

In this case, within method step c.), the at least one first production parameter is also inserted into the consistent representational form of the first data structure and is possibly also transformed into the corresponding representation or adapted to the latter for this purpose. In a comparable manner, the at least one second production parameter is also inserted into the consistent representational form of the second data structure and is possibly also transformed into the corresponding representation or adapted to the latter for this purpose.

In this manner, a wide variety of further sensor values or other values relating to the production sequence, the method sequence, corresponding production steps or devices, starting materials or conditions, or other parameters characterizing production or a method, can be introduced into the corresponding analysis.

An analysis in accordance with the present disclosure, for example, can therefore be improved further and/or made more robust or more sensitive, for example, depending on the choice of the corresponding parameters and of the comparison or evaluation method.

A production parameter may be any property of the processed product available during the selected production step or of the production installation, the property being available at the first or second point in time, for example.

For example, the at least one further first or second production parameter may also relate to the selected production step and/or may be captured or may be available at at least one further first or second point in time.

In this case, the production parameter may be captured, for example, as a time series or measured value during the progress of the selected production step. Furthermore, the production parameter may also be another value that is relevant to the selected production step, the product processed during the selected production step or the production installation, in each case during the progress of the selected production step within the period of time.

Furthermore, the method in accordance with the present disclosure may be configured such that the method is configured to monitor the movement of a vehicle such that the capture of the first image and the second image is configured as the capture of a first image and a second image of an environment detail of the vehicle, such that the capture of the at least one first sensor value and of the at least one second sensor value is configured as the capture of at least one first sensor value and at least one second sensor value relating to the vehicle or an environment of the vehicle.

In this case, the vehicle may be configured, for example, as an autonomous vehicle. Such an autonomous vehicle may be configured, for example, as an "autonomous guided vehicle" ("AVG"). An autonomous vehicle is generally considered to be a vehicle that moves without or substantially without the constant action of a human driver or even entirely without a human driver.

In the context of monitoring the movement of a vehicle, a method in accordance with the present disclosure can be configured, for example, such that an autonomous vehicle, for example, captures an image of its environment or part of its environment (for example, in the forward direction) at regular intervals of time and measured values are captured at the same time, as a sensor value, by corresponding proximity sensors of the autonomous vehicle, for example. This makes it possible, for example, to detect the appearance and analysis of objects, obstacles, road markings or comparable objects or markings, which are present or occur in the environment of the vehicle, via successive image/sensor capture operations of this type and to draw corresponding conclusions, in particular also relating to the direction of travel of the vehicle.

For example, when comparing an accordingly created first and second data structure and subsequently outputting corresponding information according to corresponding predefined criteria, the method can be configured such that, for example, the vehicle can avoid corresponding obstacles or can follow corresponding markings, for example.

This makes it possible to achieve or support, for example, safe movement of an autonomous vehicle within an industrial installation or application or in public road traffic. Furthermore, a driver of a vehicle can also be assisted in a comparable manner, such as when sudden obstacles occur, or in keeping within a corresponding lane.

If the movement of a vehicle is monitored, then a predefined or a predefinable criterion for outputting an item of information can be selected, for example, such that, when a hazardous situation occurs, for example, an object or a person on the planned route, a corresponding item of information is output. Such an item of information may be, for example, a warning message to a driver or a control message to the vehicle or a vehicle controller, which may be established, for example, to stop the vehicle, to reduce its speed and/or to change the route.

A method in accordance with the present description can furthermore also be configured such that the method is configured to analyze an image of an object or a living being such that the capture of the first image and the second image is configured as the capture of a first image and a second image of the living being or object or an area thereof in each case, and such that the capture of the at least one first sensor value and the at least one second sensor value is configured as the capture of at least one first sensor value and at least one second sensor value relating to the living being or object or an area thereof in each case.

In this case, images of objects can be used, for example, to check the quality of these objects by checking for a correct shape to be complied with or changes with respect to a shape of the object, for example. Furthermore, in this manner, objects can be checked, for example, in order to determine whether they are forgeries by using a method in accordance with the present disclosure to check for corresponding differences to an original which is likewise available or to the image of an original. In this context, corresponding sensor values may be, for example, a temperature, a color value, a surface property or another property of the object. Furthermore, they may be, for example, corresponding optical images or x-ray images or other images of a corresponding object.

The analysis of images of living beings may be used, for example, within the medical diagnosis of humans or animals. Here, optical images, x-ray images, MRI images or comparable images can be used, for example. Corresponding sensor values may be, for example, a body temperature, a pulse frequency, a pulse rate, an acoustic value (for example a breathing or lung noise value, an acoustic value recorded during coughing), an ECG value, a skin color, a circulation value or comparable sensor values.

Within a method for analyzing images of an object or a living being, the predefined or predefinable criterion for outputting an item of information may be configured, for example, such that a corresponding warning message is output, for example, in the case of a defective object or when there is an unnatural state or an illness of a living being. Such an item of information may be or comprise, for example, a corresponding warning message to a user or a corresponding automatic alarm message to an alarm system. Furthermore, information may also be corresponding control commands or control messages that automatically bring about certain states or switch off critical devices, for example.

It is a further object of the invention to provide a method for analyzing acoustic information utilizing assigned scalar values, where the method comprises a.) capturing a first item of acoustic information relating to an acoustic source and capturing at least one first scalar sensor value relating to the acoustic source, b.) capturing a second item of acoustic information relating to the acoustic source or a second acoustic source and capturing at least one second scalar sensor value relating to the acoustic source or the second acoustic source, c.) transforming the first acoustic data set to the frequency domain and inserting this frequency-transformed first acoustic data set and the at least one first scalar sensor value as a consistent representational form into a first data structure, and transforming the second acoustic data set to the frequency domain and inserting this frequency-transformed second acoustic data set and the at least one second scalar sensor value as a consistent representational form into a second data structure, d.) comparing the first data structure and the second data structure, e.) outputting an item of information if the comparison reveals a difference corresponding to a predefined or predefinable criterion.

An item of acoustic information may be, for example, any acoustic recording and/or all other acoustic data that are or can be stored in an electronic storage device, for example, or can be converted into an electronically storable format. Such acoustic information may be, for example, sound recordings, acoustic data captured using a microphone or acoustic data captured in another manner (for example, optically or via pressure measurements).

Such acoustic information can be stored in any suitable format, for example, in a "WAV" format (or as a ".wav" file), an "MP3" format (MPEG-1 Audio Layer 3; or as a ".mp3" file), a "WMA" format (Windows Media Audio; or as a ".wma" file), an "AAC" format (Advanced Audio Coding; or as a ".aac" file), an "OGG" format (Ogg Vobis; or as a ".ogg" file), a "FLAC" format (Free Lossless Audio Codec; or as a ".flac" file), an "RM" format (Real Media; or as a ".rm" file) or any desired suitable, comparable format.

The acoustic source or the second acoustic source may be, for example, a machine, a motor, a particular situation, a geographical location, one or more living beings or any other source of acoustic information.

In this case, a corresponding item of acoustic information may be, for example, a sound recording relating to one of the acoustic sources or particular parts thereof. Here, such a sound recording can be captured, for example, using a corresponding microphone. Furthermore, the acoustic information can also be captured using further suitable means, such as using optical methods for capturing vibrations or methods for capturing pressure fluctuations.

For example, a corresponding sound recording may also be recorded only in a special acoustic frequency range or using a particular acoustic filter. Here, the acoustic data may stem from or be recorded by an acoustic sensor or may be composed of data from a plurality of sensors relating to the same source.

Accordingly assigned sensor data may be, for example, corresponding temperature data or power data (for example, current or power consumption) of a corresponding machine or a corresponding motor. Furthermore, corresponding sensor data may be, for example, further sensor data relating to a corresponding situation (for example a time, a brightness value, a temperature, and/or a humidity value), a geographical location (for example, a GPS value, a stated location, an address, a time, a brightness value, a temperature, and/or a humidity value) or one or more living beings (for example a number, a temperature, and/or a time).

In this case, the at least one first and second scalar sensor value, the consistent representational form of the first and second data structures, the comparison of the first and second data structures and the output of an item of information if the comparison reveals a difference corresponding to a predefined or predefinable criterion may be configured in accordance with the present disclosure.

Furthermore, the above described methods may be configured such that the method is configured to monitor a method sequence or production sequence such that the capture of the first and second acoustic information is configured as an acoustic recording relating to an object involved in the production sequence or a situation relating to the production or method sequence, and such that the capture of the at least one first and second scalar sensor value is configured as the capture of at least one value via a sensor relating to the object involved in the production sequence or the situation relating to the production or method sequence.

In this case, the sensor, the capture of corresponding sensor values, the at least one first and second scalar sensor value, the object involved in the production sequence and the situation relating to the production or method sequence can be configured in accordance with the present disclosure.

Furthermore, objects involved in the production sequence may be, for example, devices or machines that are involved in production and which record corresponding acoustic information, for example, using corresponding microphones or comparable devices, during the present method. Further parameters of these machines or devices, such as power data, temperatures, speeds, and/or control parameters, can then also be captured in parallel with these acoustic recordings via corresponding sensors.

Furthermore, starting products, intermediate products and/or end products available in the production sequence may be, for example, objects involved in the production sequence. Here, corresponding acoustic information relating to such intermediate products (for example, vibration data or boiling or flowing noises) can be captured, for example, and corresponding sensor data (for example, temperatures, flow rates, chemical compositions relating to the corresponding intermediate product) can then be assigned to this information during a method according to the present description.

An object involved in the production sequence may be, for example, in the form of an end product or intermediate product of a production method. Furthermore, an object involved in the production sequence may be designed and configured, for example, as an installation or device component or an installation or device part of an installation or device used during the production method.

Furthermore, the situation relating to the production or method sequence may be assigned to a method sequence, for example, may correspond to a situation inside a combustion chamber of a gas turbine. Anomalies within such a combustion method, for example, can be detected via corresponding acoustic information (for example, combustion noises) using a method in accordance with the present disclosure. A time series of the power of the gas turbine, for example, could then be used in this case as at least one assigned sensor value.

Furthermore, a method for analyzing acoustic information using assigned scalar values in accordance with the present disclosure may also be configured such that the method is configured to analyze medical acoustic data, for example, acoustic data relating to a living being (for example, a lung noise or a coughing noise); in this case, the first and second acoustic information could be, for example, an item of acoustic information (for example, a lung noise or a coughing noise) relating to a person or an animal and the corresponding further scalar sensor values may be further medical sensor values, for example, relating to the person or animal, such as a body temperature, and/or a pulse frequency.

Furthermore, a method for analyzing acoustic information using assigned scalar values in accordance with the present disclosure may also be configured to recognize or identify persons. In such a case, the first and second acoustic information, for example, may be a sound recording relating to a person (for example, a voice recording) and the first and second sensor values may also be a value characteristic of this person, for example, a location value (for example, a GPS coordinate), a code that has been input, an eye color, or a comparable value.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below by way of example with reference to the accompanying figures, in which:

FIG. 4 shows an exemplary schematic illustration of the sequence of a comparison of the first and second evaluation graphs;

DETAILED DESCRIPTION OF THE EXEMPLARY EMBODIMENTS

FIGS. 1-4 illustrate an exemplary embodiment of a method in accordance with the present disclosure, in which the method is used for quality control as part of a production process of a battery. Here, an indication of a change in the production quality can be predicted during the production process based on the analysis of image and sensor data for different battery cells that have been produced and constitute an intermediate product of the production process of the battery. The present example is therefore an example of a method in accordance with the present disclosure for analyzing image information using assigned scalar values relating to a situation.

Figure 1:
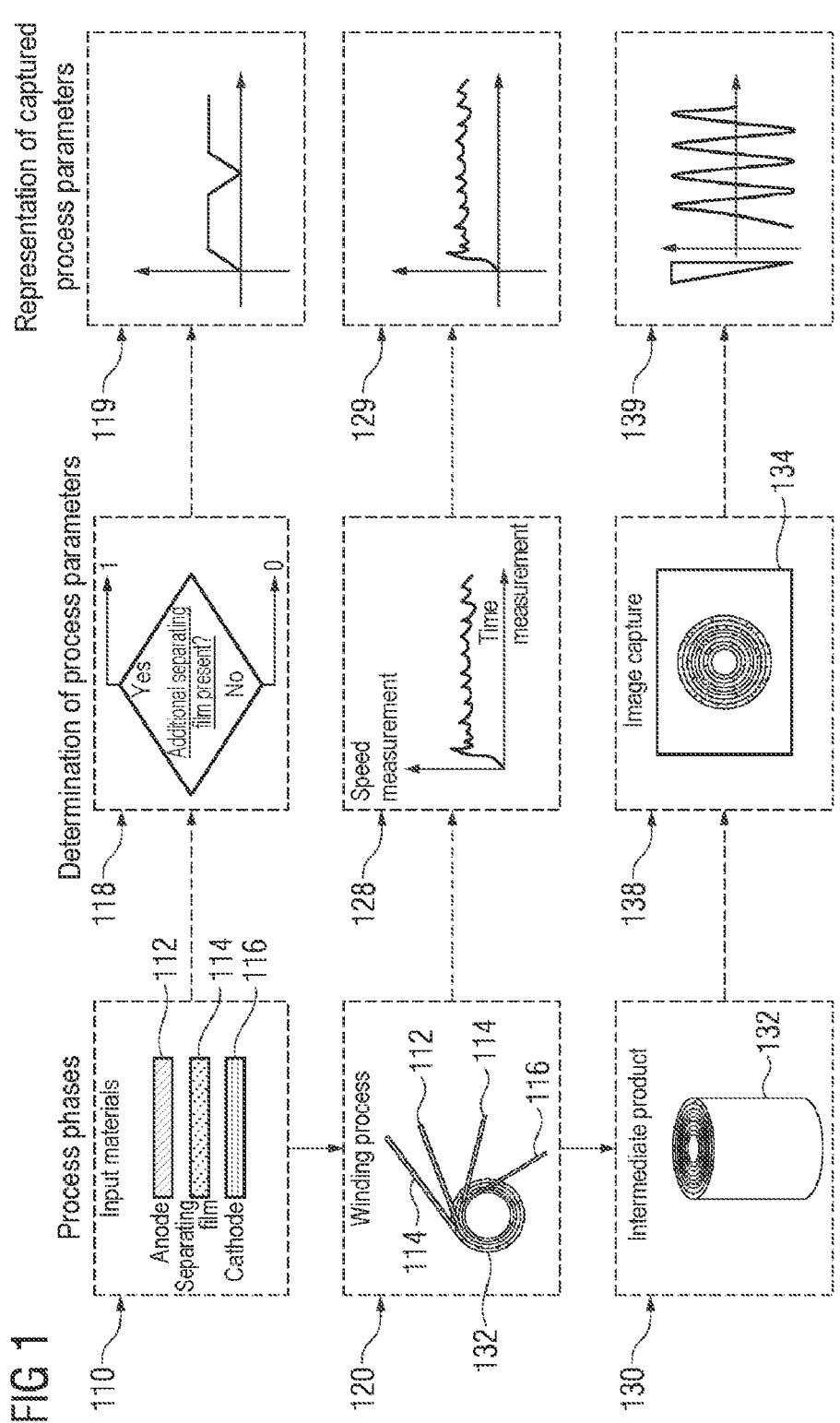
FIG. 1 shows a schematic illustration of some phases of an exemplary process sequence for winding a battery cell and the determination of associated process parameters for the subsequent analysis in accordance with the invention.

In the left-hand part of the image, FIG. 1 shows three process phases of a process for winding film layers 112, 114, 116 for producing a wound battery cell 132 that constitutes an intermediate product in the context of corresponding battery production.

In the context of FIGS. 1-4, this example is now taken as a basis for explaining how a quality check of the winding of the film layers 112, 114, 116 for producing the wound battery cell 132 can be achieved with the aid of an exemplary configuration of a method in accordance with the present disclosure.

The three process phases illustrated in the left-hand part of FIG. 1 consist of a first phase 110 that involves providing input or starting materials that are used to produce a battery cell within the process sequence illustrated. Provided as input materials in this case are an anode film 112, a separating film 114 and a cathode film 116 that are made available, as a layer structure, to a downstream winding process 120 which is illustrated in the center of the left-hand part of the image in FIG. 1.

As part of this downstream winding process 120, both the films provided, i.e., the separating film 114, the anode film 112, another separating film 114 and the cathode film 116, and the battery cell 132 produced by winding these films 114, 112, 116 are illustrated.

In a third process phase 130, which is also illustrated in the left-hand part of FIG. 1, the finished intermediate product, i.e., the wound battery cell 132, is illustrated. This battery cell is now processed further to produce a battery that is ready for use, which is not illustrated in FIG. 1 and is also not part of the presented example.

The central column of FIG. 1 schematically illustrates how corresponding process and sensor parameters are determined as part of the explained process phases 110, 120, 130. A first determination step 118 determines a parameter that comprises whether an additional separating film 114 is used when winding the films 112, 114, 116 in method step 120. If such an additional separating film 114 is used, the corresponding process parameter is set to one and otherwise it is zero.

A central image 128 in the central column in FIG. 1 illustrates the determination of at least one winding speed 128, which is an example of a sensor value in accordance with the present disclosure, with respect to the winding process 120. In order to determine this winding speed, a time series is captured, in which the winding speed when winding the battery cell 132 during the winding process 120 is captured at different points in time during this winding process 120.

FIG. 1 also shows, in a lower illustration 138, the capture 138 of an image 134 of the front side of the wound battery cell 132. In this case, this image 134 is recorded such that the wound layer structure can be seen.

The right-hand part of the image of FIG. 1 then shows representations 119, 129, 139 each showing representations of the captured process parameters 119, sensor parameters 129 and image information 139.

The process parameters determined in method step 118 are illustrated in the representation 119 in the vertical direction against the time that is plotted in the horizontal direction.

Furthermore, the winding speeds captured in method step 128 are plotted in a corresponding representation 129 on the vertical axis against the respectively determined time which is plotted on the horizontal axis.

The lowermost right-hand representation 139 in FIG. 1 illustrates a schematic representation 139 of the result of a frequency transformation of the image 134. Here, a "discrete cosine transform" (DCT) is used in the present exemplary embodiment to transform the frequency of the image 134, as is also used, for example, as standard within the scope of the JPEG compression of images to transform the frequency of the image to be compressed. Only one of the harmonic waves is symbolically illustrated in one direction in the representation 139 of the frequency-transformed image.

Figure 2:
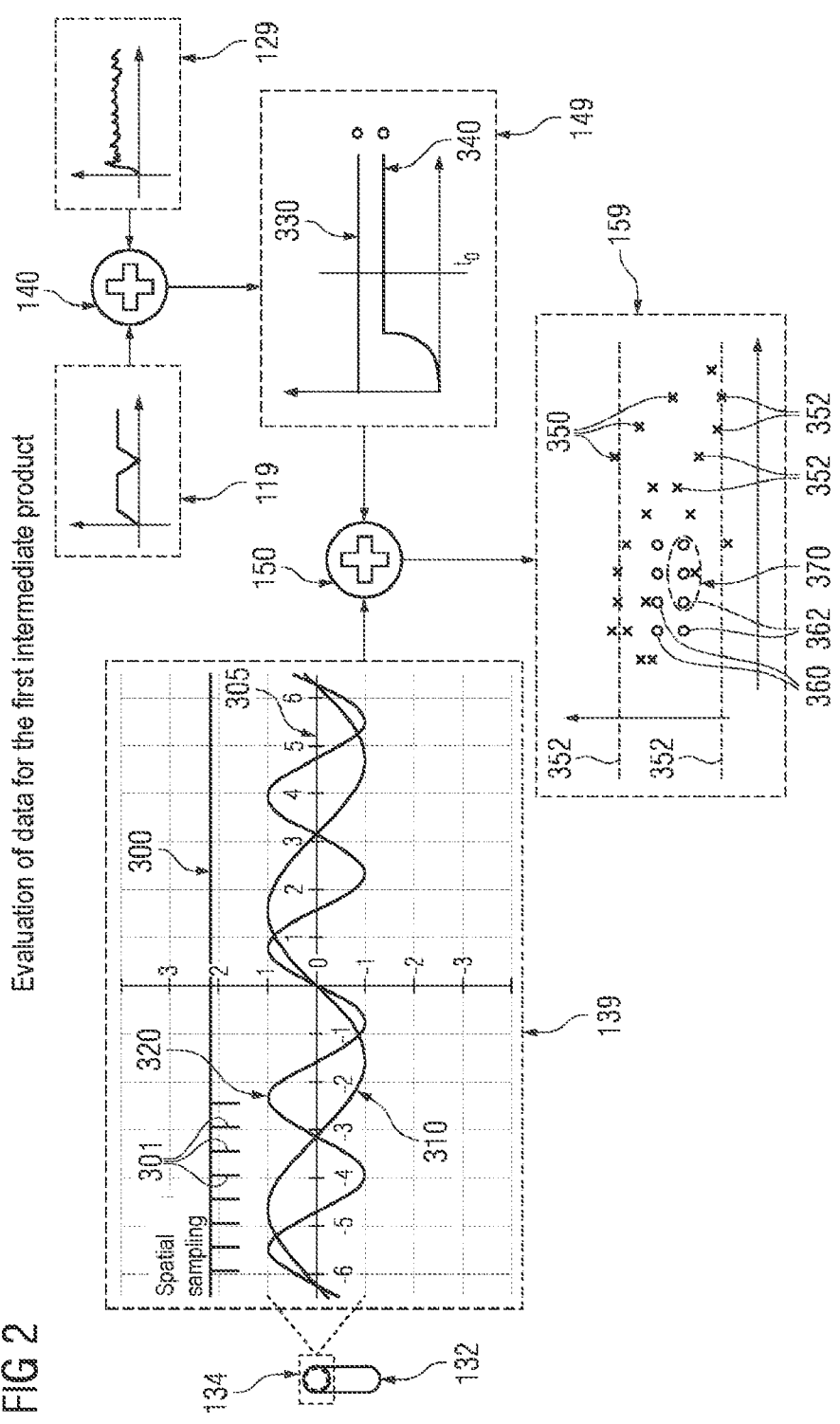
FIG. 2 shows an exemplary schematic illustration of the sequence for creating a clustered evaluation graph relating to a first wound battery cell in accordance with the invention.
Figure 3:
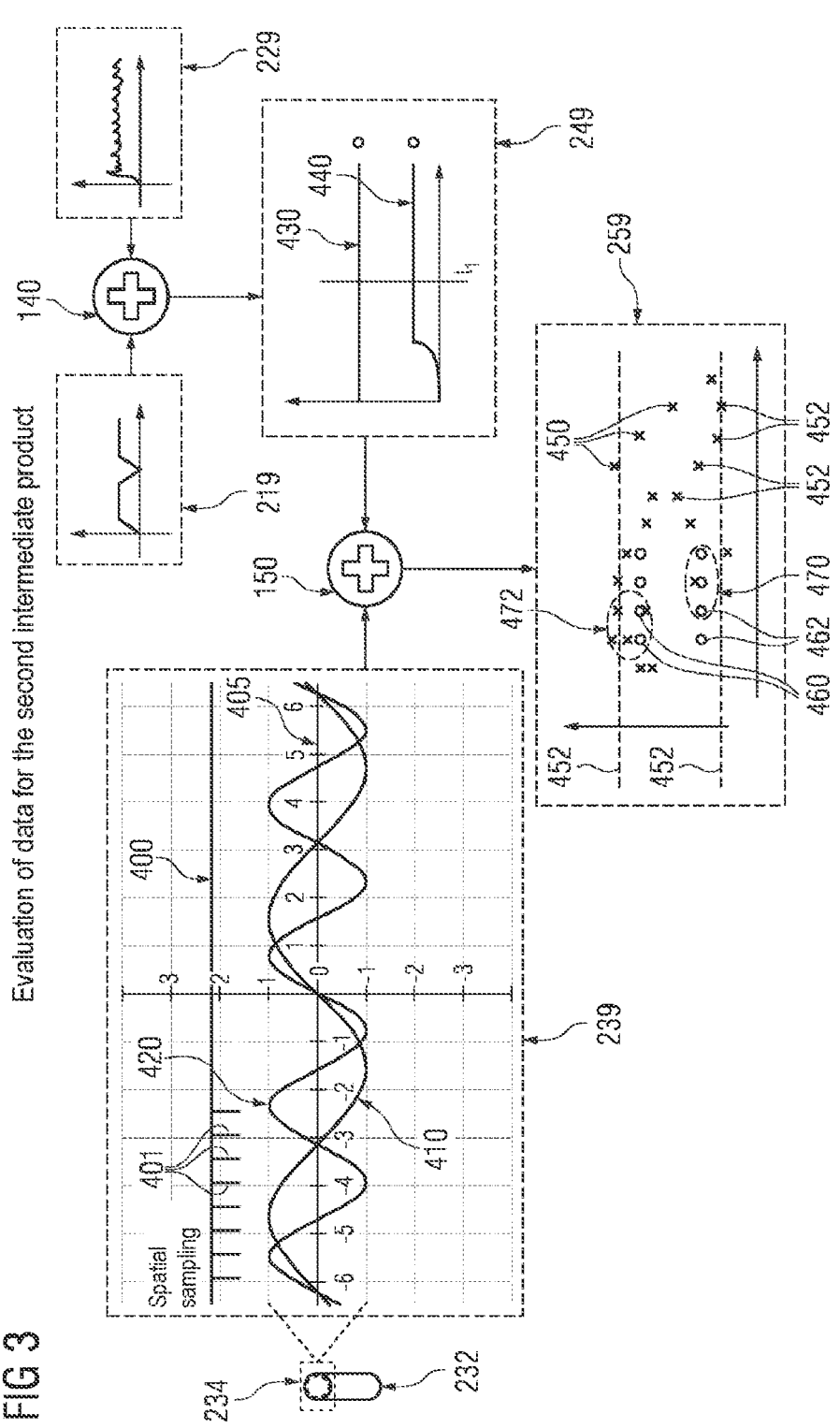
FIG. 3 shows an exemplary schematic illustration of the sequence for creating a clustered evaluation graph relating to a second battery cell in accordance with the invention.

FIGS. 2 to 4 now show the evaluation steps that enable the above-mentioned quality check of the battery cells.

Here, FIG. 2 is taken as a basis for explaining how a first evaluation diagram 159 relating to a first wound battery cell 132 is created on the basis of an image 134 captured for the first wound battery cell 132 and the process parameters 119 and winding speeds 129 determined during the corresponding winding process. Here, the first wound battery cell 132 is an example of a first intermediate product in accordance with the present disclosure and the first evaluation diagram 159 is an example of a consistent representational form of a first data structure in accordance with the present disclosure.

FIG. 3 is then taken as a basis for accordingly explaining the creation of a second evaluation diagram 259 for a second wound battery cell 232 based on an accordingly recorded image 238 and using process parameters 219 and winding speeds 229 determined during the winding process. Here, the second wound battery cell 232 is an example of a second intermediate product in accordance with the present disclosure and the second evaluation diagram 259 is an example of a consistent representational form of a second data structure in accordance with the present disclosure.

FIG. 4 is subsequently then taken as a basis for explaining in more detail the comparison of the created evaluation diagrams 159, 259 in order to check a quality of the wound battery cells 132, 232.

As already mentioned, FIG. 2 illustrates the creation of a first evaluation diagram 159 with respect to the process, sensor and image values determined during the process illustrated in FIG. 1. This evaluation diagram 159 is an example of a consistent representational form of a first data structure in accordance with the present disclosure using the example of the process sequence presented as part of FIG. 1 and the process, sensor and image values determined in the process.

In a first creation step 140 for creating the first evaluation diagram 159, the parameter values 119 determined for the winding process of the first battery cell 132 and the determined winding speed values 129 are first of all changed to a standard parameter data diagram 149. The parameter values 119 and the winding speed 129 are accordingly standardized for this purpose. In the present example, this may be configured, for example, such that the value "1" for the parameter value "additional film is present" is equated with a mean value of the determined winding speed in 129.

In the standard parameter data diagram 149, the normalized winding speed 340 is now plotted against a time axis and the parameter value 330 present when winding the first battery cell 132 is plotted against the time axis in an accordingly standardized manner.

In a subsequent, second creation step 150, the standard parameter data diagram 149 which has just been created and data from the frequency-transformed image 139 are changed to a standard format to then create the first evaluation diagram 159.

In this case, a representation in which individual harmonic waves 320, 310 of the frequency transformation are represented on a spatial axis 305 is selected for the frequency-transformed image 139 of the first battery cell 132. The spatial axis 305 may generally correspond to a section along a predefined direction through the captured image 134 or a detail thereof. FIG. 2 shows a detail of a horizontal section through the recorded image 134.

The representation of the frequency-transformed image 139 on the left-hand side of FIG. 2 is a simplified representation of a first frequency-transformed image 139 of a first battery cell 132 that was produced during the process sequence presented in FIG. 1. This simplification was performed for reasons of clarity. The simplification involves only one component of the DCT being represented in the representation 139 for the DCT of an image that is used and is usually performed in two directions. Furthermore, a further simplification is the fact that only a first harmonic frequency 310 and a second harmonic frequency 320 of the DCT that has been performed are shown in the representation 139. The two harmonic waves 310, 320 represented by way of example are plotted against the spatial axis 305 in the representation 139 in FIG. 2, where the phase shift and period length of these harmonic waves 310, 320 are each a result of the DCT.

In order to create the first evaluation diagram, the data of the frequency-transformed image 139 are sampled at a particular spatial sampling frequency and these samples are then used to create the first evaluation diagram 159. In this regard, a second spatial axis 300 is also depicted in the frequency-transformed image 139 and symbolically illus- trates a selection of sampling points 301 at which the individual harmonic waves 310, 320 of the image trans- formed to the frequency domain are each sampled. Here, twice the spatial frequency of the highest harmonic oscilla- tion represented in the frequency-transformed image can be used as the spatial sampling frequency, for example.

Samples for the first harmonic wave 310 are depicted in the first evaluation diagram 159 as data points 352 repre- sented as crosses. Samples for the second harmonic wave 320 are likewise depicted in the first evaluation diagram 159 as data points 350 represented as crosses. Furthermore, as part of the second creation step 150, a parameter value 360 and a winding speed value 362 are each taken from the standard parameter data diagram 149 at a predefined or predefinable point in time $T_0$. Here, the point in time $T_0$ may correspond, for example, to the point in time at which the image 134 of the wound battery cell 132 is recorded or may also precede this, for example. Here, this preceding point in time may be selected, for example, such that the respective parameters or winding speed values were available while winding the battery cell 132.

In order to integrate these parameter and winding speed values in the first evaluation diagram 159, upper and lower value limit lines 352 are now determined. This is imple- mented by determining a maximum and a minimum ampli- tude sum of all harmonic waves of the frequency-trans- formed image and using them as upper and lower limit values 352. This is depicted in the first evaluation diagram 159 in FIG. 1 as dashed lines 352. These limit lines 352 specify the scale, within which the parameter value 360 available at the point in time $T_0$ and the winding speed value 362 available at the point in time $T_0$ are recorded. Here, each of the values 360, 362 on the horizontal spatial axis of the first evaluation diagram 159 is repeatedly recorded for each of the sampling points 301, as is illustrated in FIG. 2 in the representation of the first evaluation diagram 159 using some examples.

In this manner, the first evaluation diagram 159 now contains both data of the image 134 recorded from the wound battery cell 132 and data relating to the presence of an additional intermediate film 114 and the winding speed when winding the battery cell 132.

In order to prepare for a comparison of the first evaluation diagram 159 with a second evaluation diagram 259, a conventional clustering method in accordance with the prior art is now applied to the entire set of data points of the first evaluation diagram 159. In the present example, only one cluster 370 was determined, where the cluster is depicted as a dashed line in the first evaluation diagram 159.

FIG. 3 now illustrates the creation of the second evalua- tion diagram 259, which has been created based on data of a second recorded image 234 of a second wound battery cell 232 and parameter data 219 relating to the presence of an additional intermediate film 114 when producing the second wound battery cell 232 and winding speed values 229 which were recorded during the winding of the battery cell 232. In this case, the second evaluation diagram 259 is created in a manner corresponding to the creation of the first evaluation diagram 159. The second battery cell 232 constitutes a second intermediate product within the scope of the present exemplary embodiment.

In this case, in order to create the second evaluation diagram 259, the parameter values 219 and the winding speed values 229 are again standardized in a first creation step 140 and are converted into a corresponding standard data diagram 249. In the latter, the standardized parameter values 430 and the standardized winding speed values 440 are plotted against the time.

The frequency of the recorded image 234 of the battery cell 232 is then again transformed using the DCT method, which is illustrated in FIG. 3 as a frequency-transformed image 239. Here, a first harmonic wave 410 and a second harmonic wave 420 are again illustrated against a spatial axis 405 by way of example, where the harmonic waves 410, 420 represent a selection of the waves or frequencies con- sidered as part of the DCT method. In this case, the spatial axis 405 may also generally correspond to a section along a predefined direction through the captured image 234 or a detail thereof. FIG. 3 again shows a detail of a horizontal section through the recorded image 234. The two harmonic waves 410, 420 illustrated by way of example are plotted against the spatial axis 405 in the representation 239 in FIG. 3, where the phase shift and period length of these harmonic waves 410, 420 are again each a result of the DCT.

As previously mentioned, only one dimension of the frequency transformation is also illustrated here for reasons of clarity, as is already the case in the illustration of the frequency-transformed image 139 for the first intermediate product 132.

In order to create the second evaluation diagram 259, the two harmonic waves 410, 420 illustrated are now again sampled at corresponding sampling points 401, where a selection of the sampling points 401 are illustrated in FIG. 3 along a further spatial axis 400 in the illustration of the frequency-transformed image 239.

The data points determined during this sampling with respect to the first harmonic wave 410 are recorded in the second evaluation image diagram 259 as data points 452 depicted as crosses. The data points determined via this sampling with respect to the second harmonic wave 420 are illustrated in the second evaluation image diagram 259 as data points 450 illustrated as crosses.

Furthermore, in order to create the second evaluation diagram 259, an upper and a lower limit line 452 are now again sought, for the purpose of integrating the parameter and winding speed values, by determining a maximum and a minimum amplitude sum of the harmonic waves deter- mined by the DCT. Within this framework, a parameter value 460 taken from the standard data diagram 249 at a point in time Ti and a winding speed value 262 taken from the standard data diagram 249 at the point in time Ti are recorded. Here, the parameter value 460 and the winding speed value 262 are each repeatedly recorded in the second evaluation diagram 259 for the sampling points 401, in a manner corresponding to the first evaluation diagram 159.

In order to prepare for a comparison of the first and second evaluation diagrams, a clustering method is again applied to all of the data points 450, 452, 460, 462 of the second evaluation diagram 259. In this case, the result is two clusters that are depicted by dashed lines 470, 472 in the second evaluation diagram 259 in FIG. 3.

FIG. 4 now shows the first evaluation diagram 159 and the second evaluation diagram 259, where the reference signs within the two evaluation diagrams 159, 259 correspond to the reference signs according to FIGS. 2 and 3.

FIG. 4 now shows a cluster analysis 510 that is derived from the clustering for the first evaluation diagram 159 and which results in the number of clusters, their average area as well as the coordinates of a respective center or centroid of each of the clusters determined. FIG. 4 likewise shows a cluster analysis 520 that is derived from the clustering for the second evaluation diagram 259 and that likewise results in the number of clusters, their average area and also the coordinates of a respective center or centroid of each of the clusters determined.

In the present example, the production of the first battery cell 132 corresponds to correct production, whereas there was an excessively low winding speed in the production of the second battery cell 232. Furthermore, in the present example, a predefined criterion for determining a possible error is the fact that the number of identified clusters differs between the first and second evaluation diagrams 159, 259. Further predefined or predefinable criteria for outputting an item of information could be, for example, the fact that the position of at least one cluster has changed by at least a predefined or predefinable amount or that the area covered by clusters on average or overall has changed by a predefined or predefinable amount.

Comparing the cluster analysis 510 of the first evaluation diagram 159 with the cluster analysis 520 of the second evaluation diagram 259 now makes it possible, for example, for a computer or a user to determine that the number of clusters has increased to two in the second evaluation diagram. According to the predefined criterion, a corresponding item of information is then output, such as a warning message to a user or a corresponding alarm or control message or a corresponding control command to the production installation or a master computer of the production installation. Such a control command or such an alarm or control message may trigger, for example, a check of different or all machine parameters or possibly also an emergency stop of the installation or installation parts.

In an alternative embodiment, the evaluation of the cluster structure 510 for the first evaluation diagram 159 and of the cluster structure 520 for the second evaluation diagram 259 can also be performed using a neural network 600. Here, the respective cluster analyses 510, 520 are input to the neural network and the neural network outputs a result that, in turn, triggers a corresponding information message when it corresponds to a corresponding error criterion. The neural network can also immediately output whether or not a corresponding information message is intended to be triggered.

Figure 5:
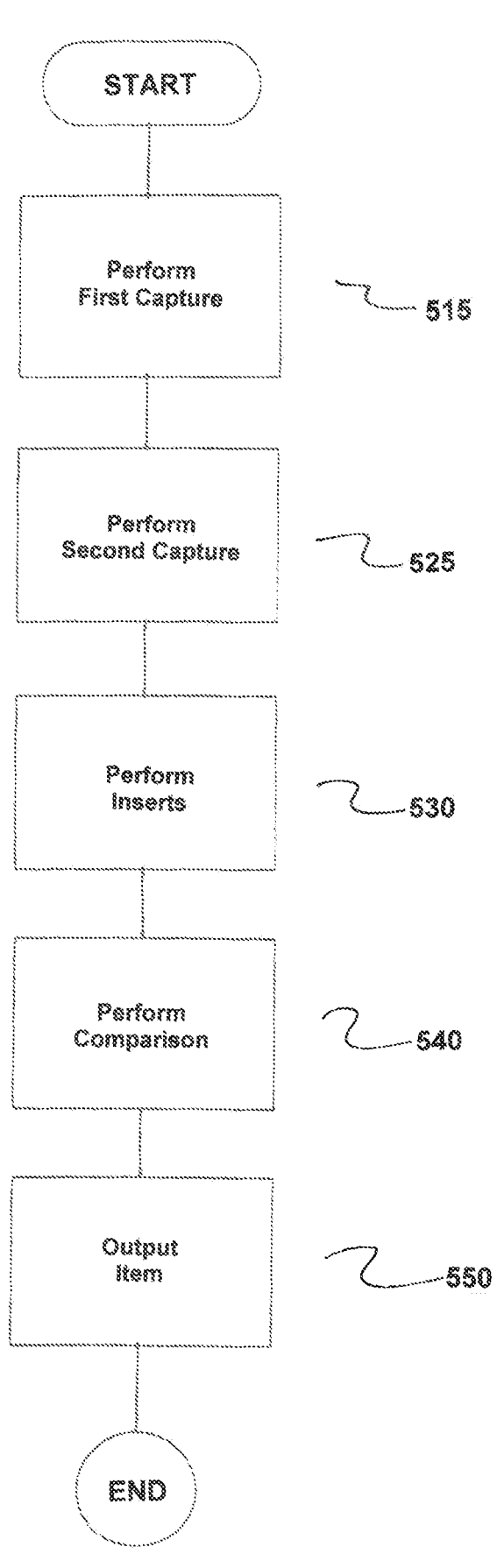
FIG. 5 is a flowchart of the method in accordance with the invention.

FIG. 5 is a flowchart of the method for analyzing image information 134, 234 utilizing assigned scalar values 119, 129, 219, 229.

The method comprises a.) capturing a first image 134 of an object 132, 232 or a situation 130 and capturing at least one first scalar sensor value 129 relating to the object 132 or the situation 130, as indicated in step 510.

Next, b.) a second image 234 of the object 132, 232 or the situation 130 is captured and at least one second scalar sensor value 229 relating to the object 132, 232 or the situation 130 is captured, as indicated in step 520.

Next, c.) the first image 134 and the at least one first scalar sensor value 129 are inserted as a consistent representational form into a first data structure 159, and the second image 234 and the at least one second scalar sensor value 229 are inserted as a consistent representational form into a second data structure 259, as indicated in step 530.

Next, d.) the first data structure 159 and the second data structure 259 are compared, as indicated in step 540.

Next, e.) an item of information is output if the comparison reveals a difference corresponding to a predefined or predefinable criterion, as indicated in step 550.

Figure 6:
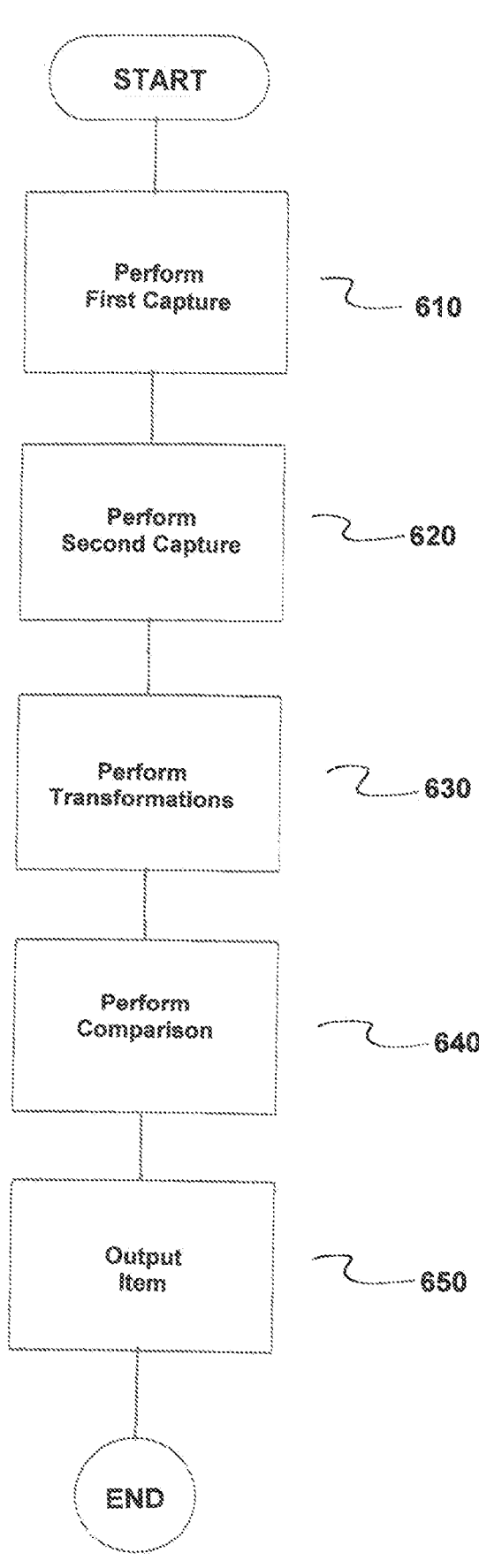
FIG. 6 is a flowchart of the method in accordance with an alternative embodiment.

FIG. 6 is a flowchart of the method for analyzing acoustic information using assigned scalar values in accordance with an alternative embodiment.

The method comprises a.) capturing a first item of acoustic information relating to an acoustic source and capturing at least one first scalar sensor value relating to the acoustic source, as indicated in step 610.

Next, b.) a second item of acoustic information relating to the acoustic source or a second acoustic source is captured at least one second scalar sensor value relating to the acoustic source or the second acoustic source is captured, as indicated in step 620.

Next, c.) the first acoustic data set is transformed to the frequency domain and this frequency transformed first acoustic data set and the at least one first scalar sensor value are inserted as a consistent representational form into a first data structure 159, and the second acoustic data set is transformed to the frequency domain and this frequency-transformed second acoustic data set and the at least one second scalar sensor value are inserted as a consistent representational form into a second data structure 259, as indicated in step 630.

Next, d.) the first data structure and the second data structure are compared, as indicated in step 640.

Next, e.) an item of information is output if the comparison reveals a difference corresponding to a predefined or predefinable criterion, as indicated in step 650.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for analyzing image information utilizing assigned scalar values to increase a reliability of an analysis of the image information, the method comprising:

a.) capturing a first image of an object or a situation and capturing at least one first scalar sensor value relating to the object or the situation;

b.) capturing a second image of the object or the situation and capturing at least one second scalar sensor value relating to the object or the situation;

c.) inserting the first image and the at least one first scalar sensor value as a consistent representational form into a first data structure, and inserting the second image and the at least one second scalar sensor value as a consistent representational form into a second data structure;

d.) comparing the first data structure and the second data structure to determine whether the comparison reveals a difference corresponding to a predefined or predefinable criterion to increase the reliability of the analysis of the image information; and e.) outputting an item of information if the comparison reveals the difference corresponding to the predefined or predefinable criterion;

wherein the method is configured to monitor a method sequence or production sequence such that the capture of the first image and the second image is configured as the capture of a first and a second image of an object relating to the production sequence or a situation relating to the production sequence, and such that the capture of the at least one first and second scalar sensor value is configured as the capture of at least one first and at least one second scalar sensor value relating to the object relating to the production sequence or the situation relating to the production sequence;

wherein the production sequence is configured to produce a product and comprises a sequence of production steps, an intermediate product existing after a selected production step from the sequence of production steps has been performed;

wherein the first image is also configured as a first intermediate product image, the at least one first scalar sensor value relates to the selected production step, the second image is configured as a second intermediate product image, and the at least one second scalar sensor value relates to the selected production step; and wherein the first data structure and the second data structure are compared via a neural network.

2. The method as claimed in claim 1, wherein the respectively captured image is respectively transformed to the frequency domain to create the first data structure and the second data structure.

3. The method as claimed in claim 2, wherein at least one first scalar parameter value relating to the object or situation is also captured within method step a.);

wherein at least one second scalar parameter value relating to the object or situation is also captured within method step b.); and wherein the first data structure and the second data structure are also created utilizing the at least one first scalar parameter value and the at least one second parameter value.

4. The method as claimed in claim 1, wherein the respectively captured image is respectively transformed to the frequency domain via a Fourier analysis method.

5. The method as claimed in claim 1, wherein at least one first scalar parameter value relating to the object or situation is also captured within method step a.);

wherein at least one second scalar parameter value relating to the object or situation is also captured within method step b.); and wherein the first data structure and the second data structure are also created utilizing the at least one first scalar parameter value and the at least one second parameter value.

6. The method as claimed in claim 1, wherein the first data structure and the second data structure one of (i) each have a two-dimensional or higher-dimensional diagram structure or a two-dimensional or higher-dimensional graph structure and (ii) are each represented or representable as a two-dimensional or higher-dimensional diagram or a two-dimensional or higher-dimensional graph.

7. The method as claimed in claim 6, wherein one of (i) a clustering method has been or is respectively applied to respective diagrams, graphs, diagram structures or graph structures of the first and second data structures when creating the first data structure and the second data structure in accordance with method step c.) and (ii) a clustering method is respectively applied to the respective diagrams, graphs, diagram structures or graph structures of the first and second data structures when comparing the first data structure and the second data structure in accordance with method step d.).

8. The method as claimed in claim 1, wherein, within method step c.), the first data structure is created utilizing at least one further first production parameter value, and the second data structure is created utilizing at least one further second production parameter value.

9. The method as claimed in claim 1, wherein the method is configured to monitor the movement of a vehicle in such that the capture of the first image and the second image is configured as the capture of a first image and a second image of an environment detail of the vehicle, and such that the capture of the at least one first sensor value and the at least one second sensor value is configured as the capture of at least one first sensor value and at least one second sensor value relating to the vehicle or an environment of the vehicle.

10. The method as claimed in claim 1, wherein the method is configured to analyze an image of an object or a living being such that the capture of the first image and the second image is configured as the capture of a first image and a second image of the living being or object or an area thereof in each case, and such that the capture of the at least one first sensor value and the at least one second sensor value is configured as the capture of at least one first sensor value and at least one second sensor value relating to the living being or object or the area thereof in each case.

* * * * *